United States Patent [19]

Staehs

[11] Patent Number: 5,325,974
[45] Date of Patent: Jul. 5, 1994

[54] DISPLAY DEVICE FOR ELONGATED OBJECTS

[75] Inventor: Joel L. Staehs, DeSoto, Tex.

[73] Assignee: BAE Automated Systems, Inc., Carrollton, Tex.

[21] Appl. No.: 52,725

[22] Filed: Apr. 26, 1993

[51] Int. Cl.⁵ .................................. A47F 5/00
[52] U.S. Cl. ..................... 211/60.1; 211/70.5; 198/803.01
[58] Field of Search ............... 211/60.1, 70.5, 70.2, 211/122; 198/803.01, 465.1, 465.2

[56] References Cited

U.S. PATENT DOCUMENTS 3,498,445  3/1970  Piper .
3,552,540  1/1971  Piper .
5,101,964  4/1992  Westphal ............... 198/803.01
5,224,585  7/1993  Blanco et al. ............ 198/803.01

*Primary Examiner*—Robert W. Gibson, Jr.
*Attorney, Agent, or Firm*—Lorusso & Loud

[57] ABSTRACT

A display device for elongated objects is presented, the device being suitable for use in conjunction with a flat plate baggage claim apparatus. The device includes a rigid plate adapted to be attached to the upper surface of a flat plate of the claim apparatus, a base plate fixed to the rigid plate, and a channel member fixed to the base plate and upstanding therefrom, the channel member and the base plate defining a compartment open on one side and an upper end thereof, and adapted to receive, retain, and display elongated objects, such as skis.

12 Claims, 7 Drawing Sheets

DISPLAY DEVICE FOR ELONGATED OBJECTS

BACKGROUND OF THE INVENTION (1) Field of the Invention

The invention relates to display devices and is directed more particularly to a display device adapted for use in conjunction with a flat plate claim apparatus of the type used in airports, and adapted to receive and retain elongated objects open to the view of claimants.

(2) Description of the Prior Art

Flat plate claim apparatuses are in use in many airports. The apparatus typically comprises a moving belt made up of a series of flat plates extending generally transversely of the direction of travel. The flat plates are somewhat crescent-shaped to facilitate the movement of the plates through curves in such a manner as to maintain the integrity of the belt, that is, such that no openings appear in the belt. Examples of apparatuses of this type are found in U.S. Pat. No. 3,498,445, issued Mar. 3, 1970, in the name of R. J. Piper, and U.S. Pat. No. 3,552,540, issued Jan. 5, 1971, in the name of R. J. Piper. Such apparatuses perform well with respect to ordinary items of baggage, such as suitcases. The apparatus receives the suitcases, as from a chute, or manually, and transports and displays the suitcases, such that claimants may recognize the items they wish to retrieve, and remove the claimed items from the apparatus.

In the case of long objects, such as skis, fishing poles, rifles, golf clubs, and the like, other means must be used inasmuch as the length of such an item may well exceed the width of the moving belt, causing jam-ups at a chute entry point and at curves in the path of the belt. It is commonplace to handle such items separately from the "normal" baggage and deliver such items to the claim area by separate means. If there are a large number of such items, as at a destination in which skiing or golfing, or the like, is a principal event, the crowd gathered in what usually is a relatively small area for such "special" pieces can result in long waits and considerable inconvenience in claiming the items.

There is a need for means for adapting the known flat plate claim apparatus to handle elongated items, such that the elongated items may be displayed and claimed in the same manner as normal baggage.

SUMMARY OF THE INVENTION

It is, therefore, an object of the invention to provide a device suitable for use in conjunction with a flat plate claim apparatus and which accepts and retains elongated objects, and which is attached to the flat plate claim apparatus so as to carry and display the elongated objects along the claim apparatus path for viewing and retrieving by claimants.

With the above and other objects in view, as will hereinafter appear, a feature of the present invention is the provision of a display device adapted for use in conjunction with a flat plate claim apparatus, the device comprising a rigid plate adapted for attachment to a flat plate of the flat plate claim apparatus, a base plate fixed to the rigid plate, and a channel member fixed to the base plate and upstanding therefrom, the channel member and the base plate defining a compartment open on one side and an upper end thereof, and adapted to receive and retain elongated objects.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENT

Figure 1:
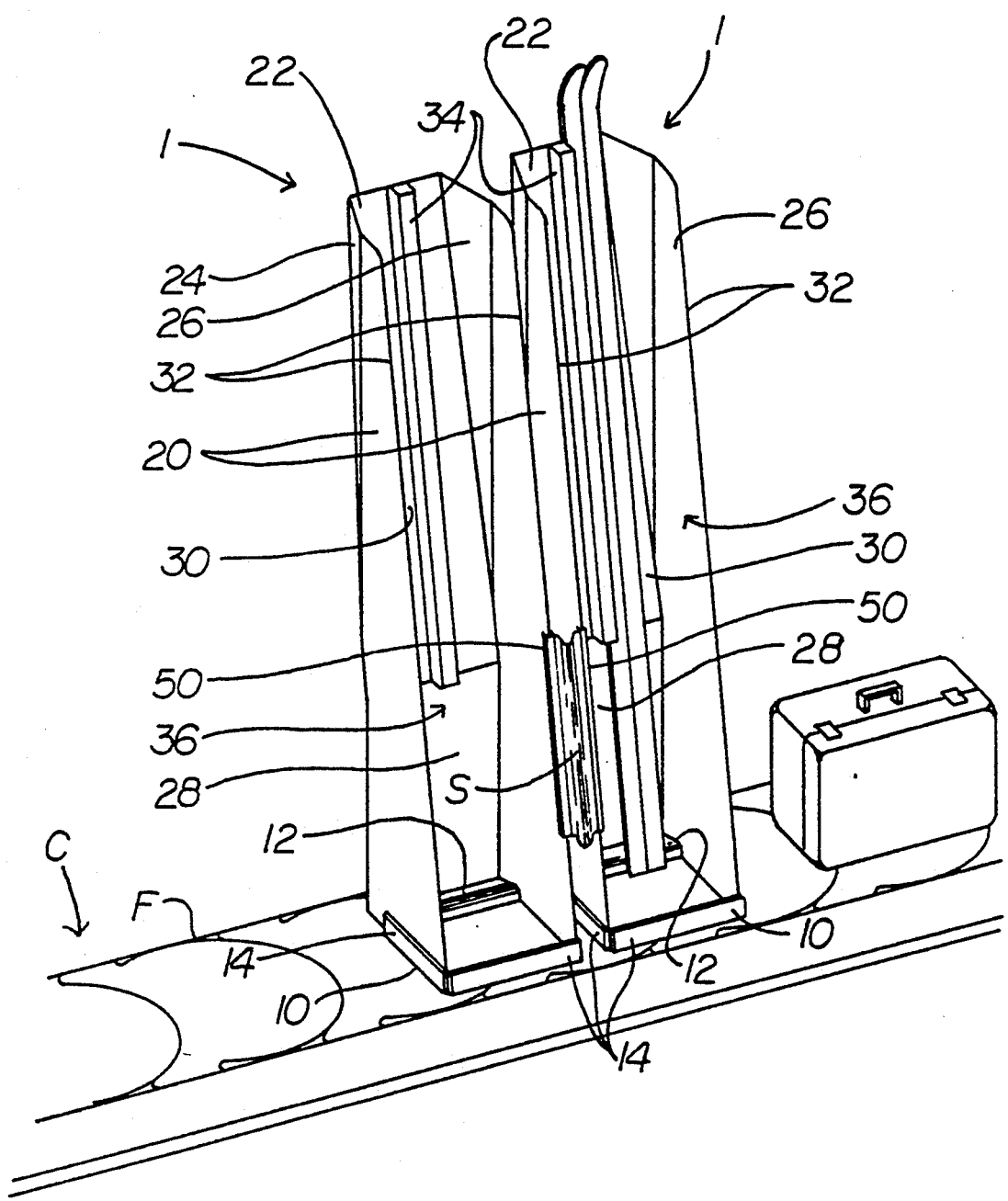
FIG. 1 is a perspective view of one form of a display device, illustrative of an embodiment of the invention, shown mounted on a flat plate claim apparatus.
Figure 2:
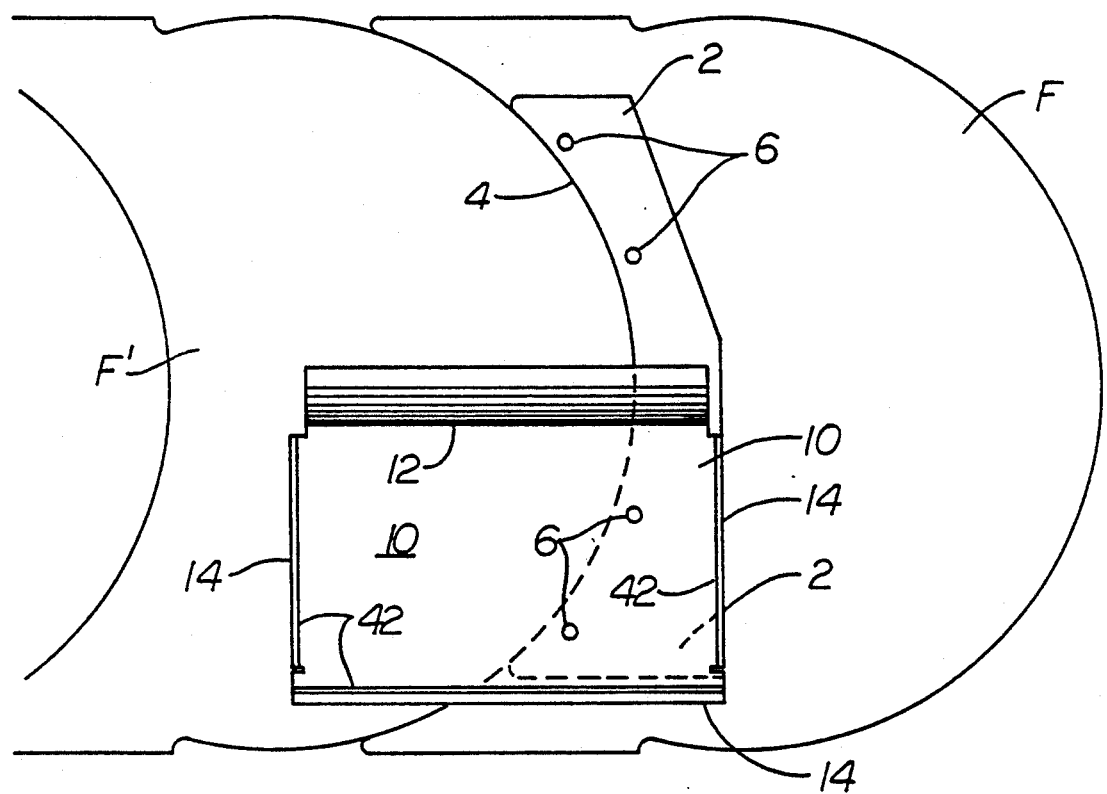
FIG. 2 is a top plan view of two flat plates of the claim apparatus of FIG. 1, with a rigid plate of the display device mounted on one of the flat plates, and a base plate of the display device mounted on the rigid plate.
Figure 3:
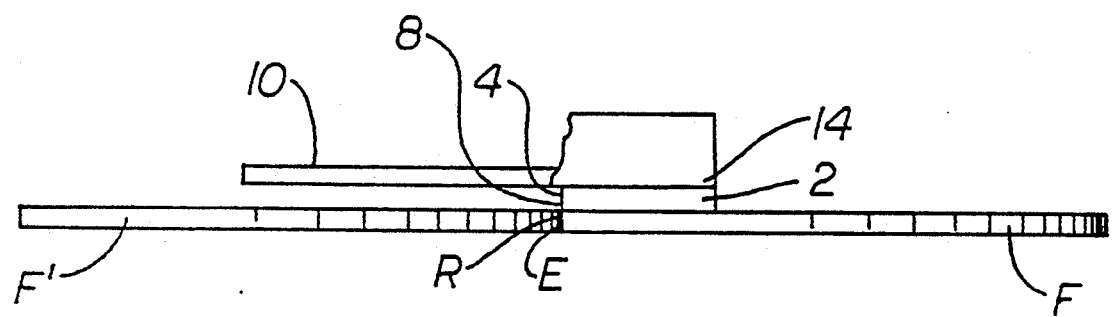
FIG. 3 is a front elevational view of the flat plates, rigid plate and base plate of FIG. 2.

Referring to the drawings, particularly FIGS. 1-3, it will be seen that the illustrative device 1 includes a rigid plate 2, preferably of steel. The plate 2 is generally of a crescent configuration, including a curved edge 4. It is the rigid plate 2 which adapts the device for use with a particular flat plate claim apparatus C. The plate 2 is provided with a configuration in part substantially duplicating the configuration of a single flat plate F of a selected flat plate claim apparatus C. In particular, the curved edge 4 of the rigid plate 2 conforms with the corresponding curved edge E (FIG. 3) of the selected flat plate F. Thus, when the rigid plate 2 is affixed to the flat plate F, the rigid plate concave edge 4 provides a surface 8 co-extensive with a surface R provided by the flat plate curved edge E.

The rigid plate 2 is provided with a plurality of holes 6 (FIG. 2) which comprise means by which the rigid plate is attached to the upper surface of a claim apparatus flat plate F. The claim apparatus flat plate F is provided with threaded holes adapted to receive threaded bolts. The holes 6 of the device rigid plate 2 are disposed in locations in the rigid plate corresponding precisely with the locations of the holes in the claim apparatus flat plate F.

Fixed to the rigid plate 2 is a base plate 10 (FIGS. 2 and 3) having near a rear edge thereof a ridge 12 extending from side to side of the base plate 10. Each of the remaining three edges of the base plate 10 have elongated upwardly extending flanges 14. The base plate 10 preferably is of metal and is welded to the rigid plate 2. The base plate 10 extends beyond the periphery of the rigid plate 2 and overhangs a neighboring flat plate F'.

By the thickness of the rigid plate 2, the base plate 10 is spaced from the flat plate F' so as not to interfere with the normal movement of the flat plates F, F'.

Fixed to the base plate 10 is a channel member 20 (FIGS. 1 and 4-6) having a back panel 22 and two side panels 24, 26. The back panel 22 includes a lower portion 28 which upstands substantially vertically from the base plate 10 and an upper portion 30 which extends upwardly from the lower portion and inclines rearwardly. Forward edges 32 (FIG. 4) of the side panels 24, 26 extend upwardly and rearwardly from the base plate 10. The back panel upper portion 30 preferably is provided with a reinforcing spine structure 34 centrally thereof. The channel member 20 and the base plate 10 define a chamber 36 open at one side and at the top, the chamber 36 being adapted to receive and retain elongated objects.

The channel member 20 preferably is of rigid plastic and may be adhesively attached to the base plate 10 at the flanges 14. The spine structure 34 may comprise a molded tubular portion 38 (FIG. 6) with a rigid reinforcing rod 40 of metal, plastic or wood therein.

In assembly, the flanges 14 are provided with adhesive on the interior surfaces 42 (FIG. 2) thereof, and the channel member 20 is slid into the area bounded by the flanges 14 until lower edges of the channel member 20 engage the base plate 10.

Figure 4:
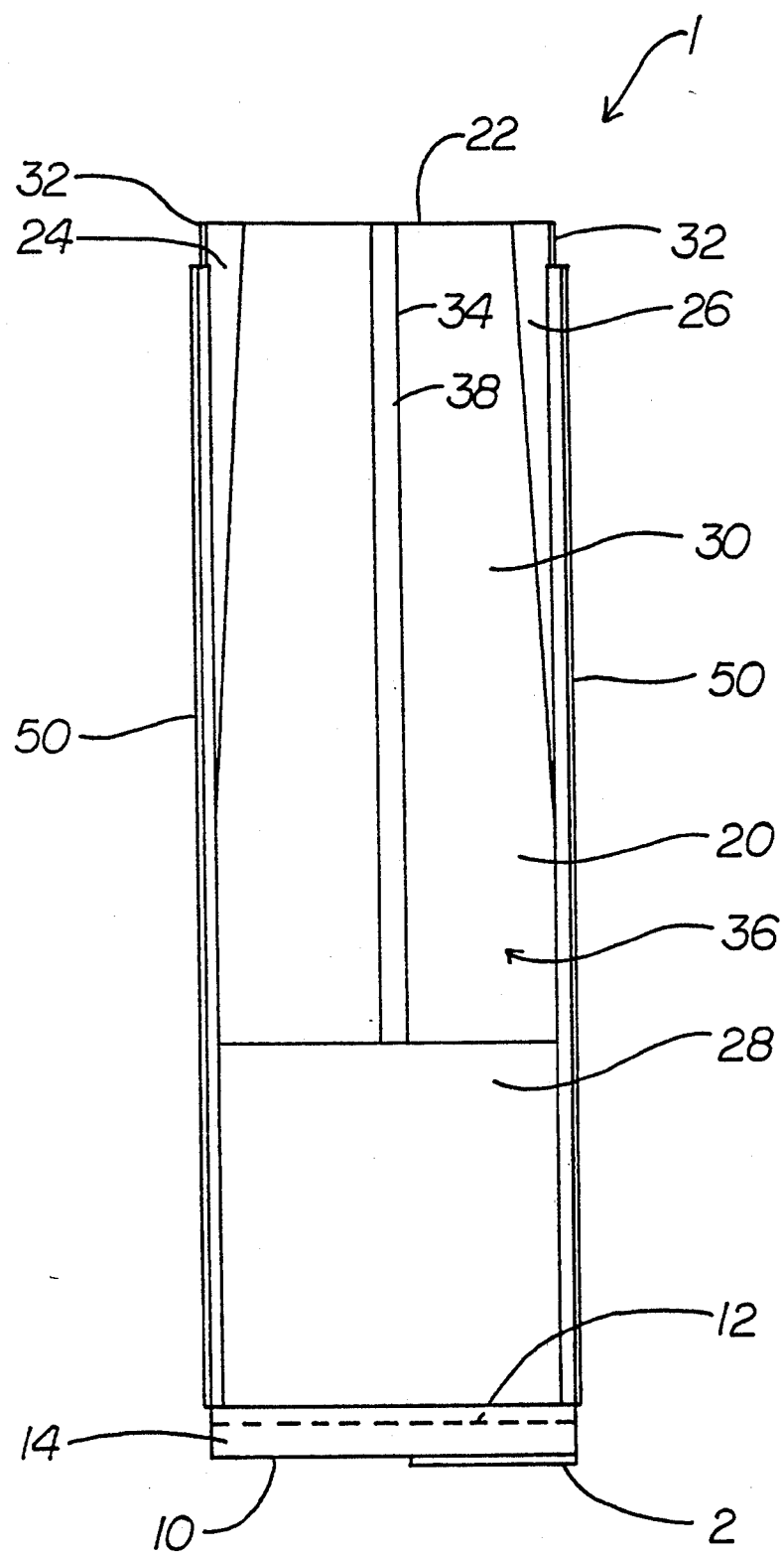
FIG. 4 is a front elevational view of the display device.
Figure 5:
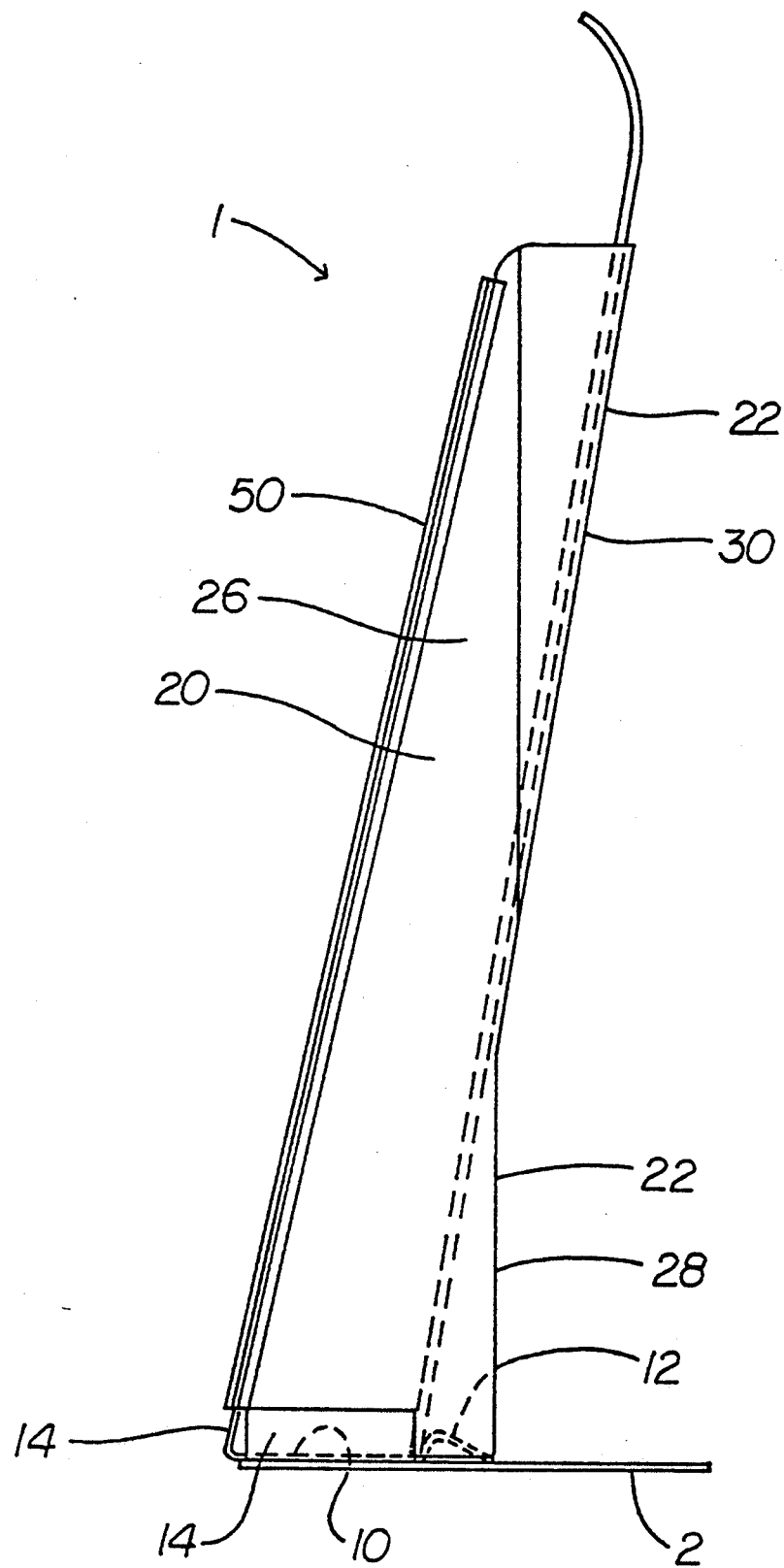
FIG. 5 is a side elevational view thereof, with a ski shown in position in the device.
Figure 6:
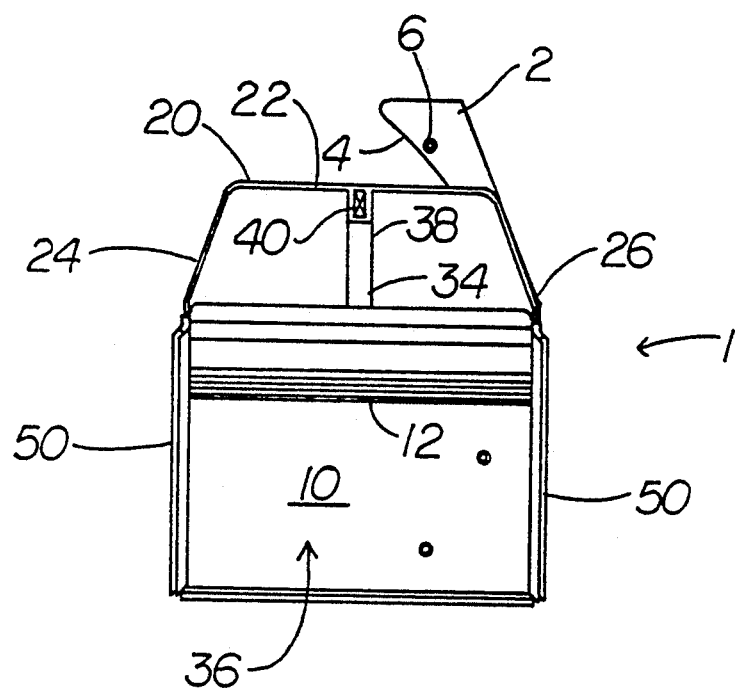
FIG. 6 is a top plan view thereof.
Figure 7:
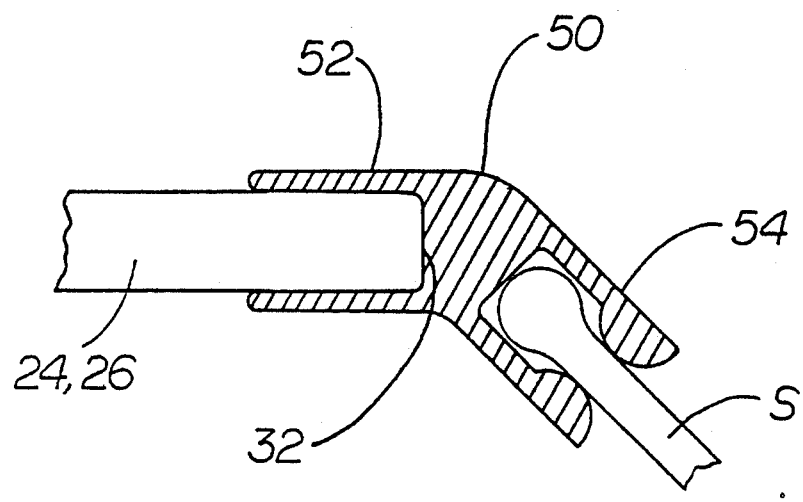
FIG. 7 is a sectional view of a mounting strip disposed on free edges of the device.

The edges 32 of the channel member 20 are each provided with a mounting strip 50, shown in place in FIGS. 4-6 and in section in FIG. 7. The mounting strip 50 has a first U-shaped portion 52 (FIG. 7) adapted for placement over the edge 32 of the channel member side panel 24, 26, and a second gripper portion 54 adapted to receive and retain an edge of a screen S (FIG. 7), or flap, which extends between neighboring devices. A small segment of the screen S is shown in FIG. 1 for illustrative purposes. The screen S is of flexible sheet material, which accommodates to the devices moving through curved portions of the path of the claim apparatus. Thus, there is provided to the view of the claimants, a number of channel members open on the side facing the claimants, and between the channel members the screens, which afford a pleasing appearance, act to prevent an accidentally dropped item from falling between devices, and deter a claimant from putting a hand between closely neighboring devices. As devices round a bend, the gap therebetween widens, but when the devices return to a straight-away, the gap narrows and could close upon a hand disposed between the neighboring devices. The screen S serves to discourage insertion of a hand or item into the gap, and thereby serves as a safety feature.

To use the device disclosed herein, in conjunction with a prior art flat plate claim apparatus, it is necessary that threaded holes be tapped in the selected flat plates F of the apparatus on which it is desired to mount the device. In flat plate claim apparatus made and installed with the devices disclosed herein in mind, the holes are provided in each flat plate, or a selected number of flat plates.

In operation, the rigid plate 2 is affixed by threaded bolts to a flat plate F of the flat plate claim apparatus C, which operates to affix the upstanding display device 1 to the claim apparatus. Screens are mounted on the strips 50, so as to extend from one device to another, filling the gaps between neighboring devices. The device is oriented on the claim apparatus such that the open side faces outboard, or toward the claimants, facilitating easy recognition of, and retrieval of, the items in the device. Elongated items, such as skis, may be placed on end on the base plate 10 and rested against the back panel upper portion 30. In loading a device, one end of the elongated object thrust into the channel member is slid along the upper surface of the base plate 10 until the end engages the base plate ridge 12. The upper end of the elongated object is then rested on the back panel upper portion 30, as shown in FIG. 5. Inasmuch as the device is open on one side, and the skis protrude out the top of the device, the skis are displayed to claimants as the claim apparatus winds about its path. The skis may readily be removed from the channel member 20, through the open side.

It is to be understood that the present invention is by no means limited to the particular construction herein disclosed and/or shown in the drawings, but also comprises any modifications or equivalents within the scope of the claims.

Having thus described my invention, what I claim as new and desire to secure by Letters Patent of the United States is:

I claim:

1. A display device for elongated objects, said device being adapted for use in conjunction with a flat plate claim apparatus, said device comprising a rigid plate adapted for attachment to a flat plate of said flat plate claim apparatus, a base plate fixed to said rigid plate, and a channel member fixed to said base plate and upstanding therefrom, said channel member and said base plate defining a compartment open on one side and an upper end thereof, and adapted to receive and retain elongated objects.

2. The device in accordance with claim 1 wherein said base plate is fixed to a first portion of said rigid plate, and a second portion of said rigid plate extends outwardly from said device.

3. The device in accordance with claim 1 wherein said base plate is provided with a ridge near a first edge thereof.

4. The device in accordance with claim 3 wherein said base plate is provided along each of second, third and fourth edges with an upwardly standing flange.

5. The device in accordance with claim 4 wherein said channel member is fixed to said base plate along said flanges.

6. The device in accordance with claim 1 wherein said channel member includes a lower portion having a back panel substantially normal to said base plate and an upper portion having a back panel which inclines upwardly and rearwardly from said lower portion back panel.

7. The device in accordance with claim 6 and including a vertical spine disposed centrally of said channel member upper portion.

8. The device in accordance with claim 1 wherein said channel member open side is defined by channel member walls having edges, and including a mounting strip mounted on each of said edges, said strip being adapted to retain a screen for filling space between said device and a neighboring device.

9. The device in accordance with claim 1 wherein said rigid plate includes means facilitating attachment of said rigid plate to the upper surface of a flat plate of said flat plate claim device.

10. The device in accordance with claim 9 wherein said rigid plate is provided with a concave edge.

11. The device in accordance with claim 10 wherein said concave edge of said rigid plate is of a configuration substantially the same as a concave edge of said flat plate, such that when said rigid plate is attached to said upper surface of said flat plate said rigid plate concave edge provides a surface coextensive with a surface provided by said flat plate concave edge.

12. The device in accordance with claim 2 wherein said base plate is adapted to extend over, and be spaced from, a neighboring flat plate.

* * * * *